(12) United States Patent
Drillet et al.

(10) Patent No.: US 11,326,227 B2
(45) Date of Patent: May 10, 2022

(54) COATED STEEL STRIPS, COATED STAMPED PRODUCTS AND METHODS

(71) Applicant: ArcelorMittal, Luxembourg (LU)

(72) Inventors: Pascal Drillet, Rozerieulles (FR); Dominique Spehner, Balan (FR); Ronald Kefferstein, Saint Mitre les Ramparts (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 17/319,306

(22) Filed: May 13, 2021

(65) Prior Publication Data
US 2021/0262055 A1    Aug. 26, 2021

Related U.S. Application Data

(60) Continuation of application No. 16/413,825, filed on May 16, 2019, now Pat. No. 11,041,226, which is a
(Continued)

(51) Int. Cl.
*B32B 15/01* (2006.01)
*C21D 9/46* (2006.01)
(Continued)

(52) U.S. Cl.
CPC ............ *C21D 9/46* (2013.01); *B32B 15/012* (2013.01); *C23C 2/12* (2013.01); *C23C 2/26* (2013.01); *C23C 2/40* (2013.01); *Y10T 428/12389* (2015.01); *Y10T 428/12396* (2015.01); *Y10T 428/12757* (2015.01)

(58) Field of Classification Search
None
See application file for complete search history.

(56) References Cited

U.S. PATENT DOCUMENTS 3,240,269 A    3/1966   Thomas
4,257,549 A    3/1981   Bricmont
(Continued)

FOREIGN PATENT DOCUMENTS

AU    622697 B2    4/1992
CA    2573226 A1    1/2006
(Continued)

OTHER PUBLICATIONS

Mahesh C. Somani, et al., "Dimensional Changes and Microstructural Evolution in a B-bearing Steel in the Simulated Forming and Quenching Process," ISIJ International, 2001, vol. 41, Issue 4, pp. 361-367 ("Somani").
(Continued)

*Primary Examiner* — Daniel J. Schleis
(74) *Attorney, Agent, or Firm* — Davidson, Davidson & Kappel, LLC

(57) ABSTRACT

A pre-coated steel strip is provided. The steel strip includes a strip of base steel having a length, a width, a first side, and a second side. The length of the strip is at least 100 m and the width is at least 600 mm. An aluminum or an aluminum alloy pre-coating is on at least part of at least one of the first or second sides of the strip of base steel. A thickness $t_p$ of the pre-coating is from 20 to 33 micrometers at every location on at least one of the first or second sides. Processes, coated stamped products and land motor vehicles are also provided.

25 Claims, 4 Drawing Sheets

10μm

Related U.S. Application Data continuation of application No. 15/606,770, filed on May 26, 2017, now Pat. No. 10,550,447, which is a continuation of application No. 13/621,015, filed on Sep. 15, 2012, now Pat. No. 9,708,683, which is a division of application No. 12/447,777, filed as application No. PCT/IB2006/004019 on Oct. 30, 2006, now Pat. No. 8,307,680.

(51) Int. Cl.
  *C23C 2/12* (2006.01)
  *C23C 2/26* (2006.01)
  *C23C 2/40* (2006.01)

(56) References Cited

U.S. PATENT DOCUMENTS

| | | | |
|---|---|---|---|
| 5,023,113 | A | 6/1991 | Boston et al. |
| 5,116,645 | A | 5/1992 | Boston et al. |
| 5,495,736 | A | 3/1996 | Nishi et al. |
| 6,296,805 | B1 | 10/2001 | Laurent et al. |
| 6,815,087 | B2 | 11/2004 | Takagi et al. |
| 7,137,201 | B2 | 11/2006 | Brodt et al. |
| 7,217,331 | B2 | 3/2007 | Jambu et al. |
| 7,503,116 | B2 | 3/2009 | Machrowicz et al. |
| 7,559,998 | B2 | 7/2009 | Nishibata et al. |
| 7,708,843 | B2 | 5/2010 | Laurent et al. |
| 7,867,344 | B2 | 1/2011 | Kusumi et al. |
| 8,127,449 | B2 | 3/2012 | Bayer et al. |
| 8,307,680 | B2 | 11/2012 | Drillet et al. |
| 9,708,683 | B2 | 7/2017 | Drillet et al. |
| 2001/0042393 | A1 | 11/2001 | Kefferstein et al. |
| 2002/0114884 | A1 | 8/2002 | Friedersdorf et al. |
| 2003/0152796 | A1 | 8/2003 | Clancy et al. |
| 2004/0009366 | A1 | 1/2004 | Takagi et al. |
| 2004/0238080 | A1 | 12/2004 | Vandeputte et al. |
| 2007/0163683 | A1 | 7/2007 | Schiessl |
| 2007/0175040 | A1 | 8/2007 | Bayer et al. |
| 2008/0283156 | A1 | 11/2008 | Laurent et al. |
| 2011/0006491 | A1 | 1/2011 | Drillet et al. |
| 2011/0056594 | A1 | 3/2011 | Macherey et al. |

FOREIGN PATENT DOCUMENTS

| | | | |
|---|---|---|---|
| CN | 1472068 | A | 2/2004 |
| CN | 1531604 | A | 9/2004 |
| CN | 1829813 | | 9/2006 |
| DE | 19749706 | C1 | 3/1999 |
| DE | 102004007071 | A1 | 9/2005 |
| EP | 0356783 | | 5/1990 |
| EP | 0692549 | A1 | 1/1996 |
| EP | 0724919 | A2 | 8/1996 |
| EP | 1013785 | A1 | 6/2000 |
| EP | 1063314 | A1 | 12/2000 |
| EP | 0724919 | A | 8/2001 |
| EP | 1380666 | A1 | 1/2004 |
| EP | 1657004 | A1 | 5/2006 |
| EP | 2242863 | B1 | 1/2014 |
| EP | 3290199 | A1 | 3/2018 |
| EP | 3290200 | A1 | 3/2018 |
| FR | 1297906 | | 7/1962 |
| FR | 720079 | | 11/1995 |
| FR | 2720079 | A1 | 11/1995 |
| FR | 2758571 | A | 7/1998 |
| FR | 2787735 | | 6/2000 |
| FR | 2833504 | A1 | 6/2003 |
| FR | 1013785 | B1 | 10/2006 |
| JP | H08144037 | A | 6/1996 |
| JP | H11156293 | | 6/1999 |
| JP | 2002178069 | | 6/2002 |
| JP | 2006529002 | | 12/2003 |
| JP | 2006051543 | A | 2/2006 |
| JP | 3931251 | | 6/2007 |
| JP | 20075223345 | | 8/2007 |
| JP | 2008537977 | | 10/2008 |
| RU | 2040556 | C1 | 7/1995 |
| WO | 02103073 | A2 | 12/2002 |
| WO | 2004106573 | A1 | 12/2004 |
| WO | 2005009642 | | 2/2005 |
| WO | 2005078144 | | 8/2005 |
| WO | 2005078144 | A1 | 8/2005 |
| WO | 2006097593 | A | 9/2006 |
| WO | 2008053273 | A1 | 5/2008 |
| WO | 2012028224 | A1 | 3/2012 |
| WO | 2012048841 | A1 | 4/2012 |

OTHER PUBLICATIONS

Declaration of Mel Desart, dated Apr. 16, 2019, relating to attached "High Strength Steels for Automotive Safety Parts," SAE Technical Paper 2001-01-0078. 2001, by Cornette, D., Hourman, T., Hudin, O., Laurent, J., and Reynaert, A.

Declaration Dr. Michael Miles, dated Jun. 28, 2019 as filed in IPR2019-01275, U.S. Pat. No. 9,708,683.

Declaration of Mel Desart, dated May 30, 2019, relating to attached "High Strength Steels for Automotive Safety Parts," SAE 2001 Transactions Journal of Materials & Manufacturing-V110-5, by Corneae, D., Hourman, T., Hudin, 0., Laurent, J., and Reynaert, A.

Declaration of Dr. Michael L. Knott dated Apr. 22, 2019 realting to attached Somani (Mahesh C. Somani, et al., "Dimensional Changes and Microstructural Evolution in a B-bearing Steel in the Simulated Forming and Quenching Process," ISIJ International, 2001, vol. 41, Issue 4, pp. 361-367 ("Somani")) from University of Michigan's Art, Architecture, and Engineering Library's Technical Services Department.

Publication History from SAE Mobilus, dated May 30, 2019 for Cornette et al., "High Strength Steels for Automotive Safety Parts" SAE Technical Paper Series 2001-01-0078, Mar. 24 001, ISSN: 0148-7191.

Fekete, J., Stibich, A., and Shi, M., "A Comparison of the Response of HSLA and Dual Phase Sheet Steel in Dynamic Crush," SAE Technical Paper 2001-01-3101, 2001.

Robert R. Mayer, "Theoretical Effects of Hydroforming on Crashworthiness of Straight Sections," ASME International Mechanical Engineering Congress and Exposition, Applied Mechanics (2004):591-603.

Publication History from ISIJ International for "Mahesh C. Somani, et al., "Dimensional Changes and Microstructural Evolution in a B-bearing Steel in the Simulated Forming and Quenching Process," ISIJ International, 2001, vol. 41, Issue 4, pp. 361-367 ("Somani")".

Webster's New Twentieth Century Dictionary (2nd ed. 1964), published by the World Publishing Company.

Random House Webster's Unabridged Dictionary (2nd ed. 1998), Random House New York.

ASM Materials Engineering Dictionary, ASM INternational, The Materials Information Society, 1992.

Dictionary of Materials and Manufacturing, Nichols Publishing: New York, 1990.

McGraw-Hill Dictionary of Scientific and Technical Terms, Sixth Edition, 2003.

Certified Translation of "alliation" and "alliage".

Ahindra Ghosh, "Secondary Steelmaking, Principles and Applications" (2001), CRC Press.

Åkerström, P. et al., "Material parameter estimation for boron steel from simultaneous cooling and compression experiments," Modelling and Simulation in Materials Science and Engineering. 2005, vol. 13, No. 8, p. 1291.

ASTM Dictionaly of Engineering Science & Technology, ASTM International 2005.

Chambers Dictionary of Science and Technology, Tenth edition, 1999.

Webster's Third New International Dictionary of the English Language Unabridged, 2003.

Engels, H. et al., "Controlling and Monitoring of the Hot-Stamping Process of Boron-Alloyed Heat-Treated Steels."—p. 135-50 ("Engels"),

(56) References Cited

OTHER PUBLICATIONS published in Liewald, M. (Ed.). "New developments in sheet metal forming": Frankfurt a.M.: MATINFO, Werkstoff-Informationsges (2006).
Declaration of Marcel Thoms of University of Stuttgart dated Jun. 7, 2019 relating to attached "Engels, H. et al., "Controlling and Monitoring of the Hot-Stamping Process of Boron-Alloyed Heat-Treated Steels."—p. 135-50 ("Engels"), published in Liewald, M. (Ed.). "New developments in sheet metal forming": Frankfurt a.M.: MATINFO, Werkstoff-Informationsges (2006)".
Certified translation of "Stahl".
Preliminary Opinion dated Jun. 19, 2019 in opposition proceedings of European Patent Application 06842403.5.
Raviere et al, Hot Stamping Experiment and Numerical Simulation of Pre-coated USIBOR1500 Quenchable Steels, SAE 2003-01-2859, 2003.
Merklein, M et al., "Einflussgrößen im Presshärteprozess" Tagungsband 4. Chemnitzer Karosseriekolloquium, Nov. 2005, ISSN: 3-937524-33-9, see English translation.
Forschungsvereinigung Stahlanwendungen e. V., "Forschung für die Praxis P644—Auslegung des Prozessfensters für die Blechumformung höchstfester Vergütungsstähle bei erhöhten Temperaturen" Düsseldorf: Verlags und Vertriebsgesellschaft mbH, 2006, ISBN: 3-937567-42-9, see partial English translation.
Usinor Auto Groupe website, Product Description, USIBOR Heat-treatable manganese-boron steel, bare or precoated 1/3, http://www.usinorauto.com/v_anglaise/produits/fiches/ a_usibor3.htm, Feb. 21, 2003.
Usinor Auto Groupe website, Product Description, USIBOR Heat-treatable manganese-boron steel, bare or precoated 2/3, http://www.usinorauto.com/v_anglaise/produits/fiches/ a_usibor3.htm, Apr. 29, 2002.
Usinor Auto Groupe website, Product Description, USIBOR Heat-treatable manganese-boron steel, bare or precoated 3/3, http://www.usinorauto.com/v_anglaise/produits/fiches/ a_usibor3.htm, Apr. 29, 2002.
Altan, 'Hot-stamping boron-alloyed steels for automotive parts—Part II: Microstructure, material strength changes during hot stamping', Stamping Journal, Jan. 2007.
Merklein M.: "Neuere Entwicklungen zur Umformung höchstfester Stahlwerkstoffe," EFB-Kolloquium 2005, see English translation.
Roll et al.: "Prozesskette zum Warmumformen von Blechen," Tagungsband SFU Leichtbau durch Umformtechnik, Sep. 2005, see English translation.
Laurent J.-P. "Hot formed Pre-coated boron steels: A solution of the resistance-formability's dilemma"—1st European Conference of Experts, Oct. 14, 2003.
Garcia Aranda L., Ravier P., Chastel Y., "Hot stamping of quenchable steels—Material data and process simulations", IDDRG conference, 2003.
Merklein M., "Characterisation of the Flow Properties of the Quenchenable Ultra High Strength Steel 22MnB5", Annals of the CIRP vol. 55/1/2006.
Turetta A., Testing material formability in hot stamping operations, 2006.
Babbit M., "Some Highlights on New Steel Products for Automotive Use," steel research international col. 77, issue 9 to 10, Dec. 13, 2016.
Laurent J.-P., "Hot formed Pre-coated boron steels, A solution of the resistance-formability's dilemma"—1st European Conference of experts, Hot Forming and Casting Tachnologies for Lightweight Automobile Design, 27 ./28. Nov. 2003.
Garcia Aranda L., Chastel Y., "Experiments and simulation of hot stamping of quenchable steels," ICTP 7th International Conference on Technology of Plasticity, Advanced Technology of Plasticity 2002, Proceedings, vol. 2, Yokohama, JP, Oct. 27-Nov. 1, 2002.
Suehiro, Masayoshi et al., "Properties of Aluminium-coated Steels for Hot-forming" Nippon Steel Technical Report No. 88, Jul. 2003.

Kefferstein R., "Development of safety and structural automotive parts by hot-stamping, the USIBOR 1500P solution", La Revue de Metallurgie, ATS—JSI 2004.
Geilfuss A., Kraska M., "Untersuchungen zum Warmumformprozess ultrahochdester Stähle"—1st European Conference of experts, Hot Forming and Casting Tachnologies for Lightweight Automobile Design, 27 ./28. Nov. 2003, see English Translation.
Gehringhoff, "Neueste Trends und Entwicklungen in der Warmumformung" aus Tagungsband"Aluminium and steel forming in automotive engineering Feb. 17-18, 2005" Berlin: tci—Technik & Kommunikation-Verl.-GmbH, 2005, In English.
Grothe, "Dubbel—Taschenbuch für den Maschinenbau" Berlin Heidelberg: Springer, 2005, Ed. 21. Auflage, ISBN: 3-540-22142-5 see English translation.
Paland, "Technisches Taschenbuch, 7. veränderier Nachdruck" Herzogenaurach: Schaeffler KG, 2002, see English translation.
Hein, Kefferstein and Dahan, 'Hot Stamping of USIBOR 1500 P: Part and Process Analysis Based on Numerical Simulation', in: Liewald (eds), New Developments in Sheet Metal Forming, 2006, in English and English partial translations.
Cornette et al., "High Strength Steels for Automotive Safety Parts" SAE Technical Paper Series 2001-01-0078, Mar. 2001, ISSN: 0148-7191.
Technische Lieferspezifikation TL VW 4225-2006:5 "Legierter Vergutüngsstahl 22Mn85 unbeschichtet oder vorbeschichtet", May 2006, see English Translation.
Vaissiere et al., "Development of pre-coated boron steel for applications on PSA Peugeot Citroen and Renault bodies in white IBEC 2003" und SAE Technical Paper Series 2002-01-2048, Jul. 2002—ISSN: 0148-7191.
TNOReport 010028844—Analyses on hot-formed coated steel samples, Aug. 20, 2015/Proces-verbaa/ Agin Boeder on sample taking of the Volkswagen Passat, see partial English translation.
"Standard Specification for Steel Sheet, Aluminum Cotaed," by Hot-Dip Process. ASTM Standard A 463/A 463M—06, 2006.
Preliminary Opinion of the European Patent Office Board of Appeal on EP 2 242 863 B1, dated Jul. 3, 2018.
Decision of the District Court the Hague on EP2242863B1, Sep. 13, 2017 including English Translation.
Winkel: "Quetten zum Presshärten von Stahlblech im Automobilbau/ Quenches for press hardening steel plate in the car industry," Fachberichte, Gaswaerme International (53) Nr. Jul. 2004, see English translation.
Engels H., Schalmin, 0., Müller-Bollenhagen, C., "Regelung und Überwachung des Warmumformprozesses borlegierter Vergütungsstähle in Vortragstexte zur Veranstaltung Internationale Konferenz "Neuere Entwicklungen in der Blechumformung" . . . " Neuere Entwicklungen in der Blechumformung in Leinfelden-Echterdingen am 9.+10. Mai 2006 unter Leitung von Prof. Dr.-Ing Liewald, 2006, English version provided.
Extended European Search Report EP3290199, dated Feb. 7, 2018.
Extended European Search Report EP3290200, dated Mar. 12, 2018.
Declaration of Sascha Sikora, Aug. 29, 2018 see partial English translation.
Remarks re EP2086755 features (Re-adjustment of EP2086755 Application Example 2), see English translation.
Expert opinion re "Citroen C5 VF7RC4HXE76658312, registration date 2005", Mar. 2, 2018, see English translation.
Expert opinion re "Citroen C5 VF7DE4HXB76075211, Registration date 2001", Aug. 15, 2018, see English translaton.
Niederschrlfl über Tatsachenaufnahme und Beobachtung des Notars anlässlich des Ausbaus eines Bauteils aus einem Fahrzeug, Oct. 22, 2018, see English translation ("Record of facts and observation of the notary on the occasion of the removal of a component from a vehicle and the metallographic preparation").
DVS Presentation by Carsten Lachmann, Jan. 18, 2008.
Application report: Examination of body components with AlSi coating systems, Application No. 18041806a-A2004 by TAZ GmbH, Aug. 27, 2018, See English translation.
Application report: Examination of body components with AlSi coating systems, Application No. 18041806a-S2001 by TAZ GmbH, Aug. 27, 2018, see English translation.

(56) References Cited

OTHER PUBLICATIONS

Kraftfahrtbundesamt, "Neuzulassungen von Personenkratwagen", Feb. 9, 2005.
Autoscout24.de, "Suchergebnisse Citroen C5, Erstzulassung 2005".
Autoscout24.de, "Suchergebnisse Citroen C5, Erstzulassung 2001".
Mobile.de, "Suchergebnisse Citroen C5, Erstzulassung 2005".
Mobile.de, "Suchergebnisse Citroen C5, Erstzulassung 2001".
Record of facts and observation of the notary on the occasion of the removal of a component from a vehicle and the metallographic preparation by Notary Eik Löffelbein, Aug. 22, 2018.
Evaluation of the porosity of the coating in a reference range of a Fig. (Fig. 22 of Cornette et al., "High Strength Steels for Automotive Safety Parts" SAE Technical Paper Series 2001-01-0078, Mar. 2001, ISSN: 0148-7191)—"Bildanalyse eines Literaturbildes, Applications-Nr. 18041806a-Literaturbild", Aug. 27, 2018, see partial translation.
Boezewinkel et al.: Tata Steel analysis of Volkwagen Passat. Project 11450, Oct. 7, 2017.
Stahl und Eisen 120 (2000) Nr. 8, Seiten 51 bis 56, "Die neue Verzinkungsanlage 2 bei Eko Stahl", "The new No. 2 hot-dip galvanizing line at Eko Stahl", Autoren: Karl Döring, Jürgen Nathow, Dietrich Kern, Michael Breiter und Dietmar Lowenberg.
Andrews, K.W. Empirical Formulae for the Calculation of Some Transformation Temperatures. Journal of the Iron and Steel Institute, 203, Part 7, Jul. 1965, 721-727.
Enlarged Fig. 7 of U.S. Appl. No. 16/413,825 (present application).
Low Carbon, Heat-Treatable Boron Steel—Uncoated or Aluminized PreCoated, GM Worldwide Engineering Standards, GMW14400.
Self-study programme 339, The Passat 2006.
Kahl, Martin, "Some like it hot" Technology focus—Hot stamping, Sep./Oct. 2004 AMS.
Kolleck, R. et al., "Investigation on induction heating for hot stamping of boron alloyed steel" CIRP Annals—Manufacturing Technology 58, (2009), 275-278.
Imose, Masayuki, "Heating and Cooling Technology in the Continuous Annealing" Transactions ISIJ, vol. 25, 1985, 911-932.
Patent Trial and Appeal Board Final Decision in IPR2019-01275, U.S. Pat. No. 9,708,683, dated Jan. 5, 2021.
Gokhale, Arun M., "Report on quantitative characterization of the microstructure of Aluminium alloy surface coating on hot-stamped US BOR 1500 steel blanks" School of Materials Science and Engineering, Georgia Institute of Technology, May 13, 2019.
Fan, Dong Wei et al., "Formation of an Aluminide Coating on Hot Stamped Steel" ISIJ International, vol. 50, No. 11, 2010, pp. 1713-1718.
Summons in EP proceeding for EP 09701846, dated Nov. 18, 2016.
Bourouga, Brahim, "Report on the heating of coated steel blanks for hot stamping" Laboratoire de therminque et enqerie de Nantes, Apr. 30, 2019.
"Continuously hot-dip coated strip and sheet of strucutral steels—Technical delivery conditions," European Standard EN 10326, Jul. 2004, NON-EN 10326.
Webpages from Usinorauto.com: "Mechanical Properties (Continued)", May 20, 2003, downloaded from http://www.usinorauto.com/v-ang/produits/definitions4.htm.
"Charakteristische Merkmale 095—Schmelztauchveredeltes Band und Blech," Stahl-Informations-Zentrum, 2005, see partial translation.
"Hot-Dip Aluminised Sheet Metal fal AS," Production information re. fire-aluminized sheet metal, Aug. 2007, published by ThyssenKrupp Steel, see English translation.
Naderi et al., "Hot stamping of ultra high strength steels", Nov. 2, 2007.
Self-study programme 339—Volkswagen Passat, Mar. 2005.
Wikipedia Article on VW Passat, downloaded at https://fr.wikipedia.org/wiki/Volkswagen_Passat, last accessed on Aug. 11, 2016 see machine translation.
Declaration by Th. A. Kop: "On the physicis of heating a blank for hot forming," Aug. 15, 2016.
Declaration by Dr Grigorieva dated Oct. 17, 2016 and curriculum vitae.
Declaration by Dr Grigorieva dated Sep. 28, 2016.
Decision of the District Court of the Hague denying the request for stay and translation dated May 18, 2016, case No. C/09/509050-HA ZA 16-435.
Bourouga: "Report on the heating of coated steel blanks for hot stamping by Pr Bourouga," Jul. 31, 2018.
Exerpt of "Harmonized Tariff Schedule of the United States (2003)—Supplement 1", chapter 99, 2003.
Arun M. Gokhale:"Quantitative Characterization and Representation of Global Microstructural Geometry," ASM Handboo, vol. 9: Metallography and Microstructures, G.F. Vander Voort, editor, p. 428-447.
Chawla et al:"Microstructure and mechanical behavior of porous sintered steels," Materials Science and Engineering A 390(2005) 98-112.
Volkswagen Aktiengesellschaft, "Fahrzeugdaten" including opinion of Ingineurbuero fuer KfZ-Technik GmbH Nr. 18BS-00988JP, observations of notary and partial translation, Aug. 2018 see partial English translation.
D4A—"Evaluation of the porosity of the coating in a reference range of Fig. 1 of D4 [WO2008/053273]" see English translation.
Wilsius et al.:"Status and future trends of hot stamping USIBOR 1500P," Tagungsband zum ersten Erlanger Workshop Warmblechumformung 2006.
D4B—"Evaluation of the porosity of the coating in a reference range of Fig. 1 of D4 [WO2008/053273]" see English translation.
Merklein et al.:"Investigation of the thermo-mechanical properties of hot stamping steels," Journal of Materials Processing Technology, vol. 177, issues 1-3, Jul. 2006, pp. 452-455.
Claim Chart comparing claims of EP2242863B1.
Hein, "Press-hardening of Usibor 1500 P : simulation-based component and process analysis", 18 pages, 9./10. May 2006, and translation thereof, 13 pages.
NEN—EN 10326 standard, Jul. 2004, 25 pages.
Zhao:"Analysis and Application of Axle Housing Hot Stamping Process", Forging Machinery, published in Mar. 2002, including English translation, 8 pages.
Zhiyao Tan:"Basic Study on Hot Stamping of Ultrahigh-strength Steel", Dissertation for Degree of Master of Tongji University, Jul. 2006, including partial translation, 41 pages.
A technical specification by Ford (1992).
Aruna Bahadur et al., "Structural Studies of Hot Dip Aluminized Coatings on Mild Steel," Materials Transactions, JIM, vol. 32, No. 11 (1991), pp. 1053-1061.
X. Bano, et al., "Heat Treated Boron Steels in the Automobile Industry," 39"' MWSP Conf. Proc., ISS, vol. XXXV, 1998.
Second Declaration of Dr. DeArdo (Apr. 7, 2020) submitted on Apr. 8, 2020 in IPR 2019-01275, re U.S. Pat. No. 9,708,683 B2.
Record of Oral Hearing, Oral Hearing Held on Oct. 7, 2020, Transcript, IPR 2019-01275, re U.S. Pat. No. 9,708,683 B2.
Declaration by Dr Grigorieva dated Sep. 28, 2016 and curriculum vitae.
Influence of Hot Deformation on Continuous Cooling Bainitic Transformation in a Low Carbon Steel, Z. D. Wang et al., Acta Metallurgica Sinica, vol. 11, No. 2, pp. 121-127, Apr. 1998.
"Various characteristics of aluminum-coated steel sheet for hot pressing", Masayoshi Suehiro et al., Nippon Steel Technical Report, No. 378 (2003), pp. 15-20, see English Abstract.
The high-temperature oxidation behavior of hot-dipping Al—Si coating on low carbon steel, Chaur-Jeng Wang et al., Surface & Coatings Technology 200 (2006) 6601-6605.
Etude thermo-mécanique et modélisation numérique de l' emboutissage à chaud de l'Usibor 1500, Lucia Garcia Aranda, the cover, the table of contents, pp. 1-15, 40-51, 82 and 104-106 see machine translation.
New Practical Hardware Manual, edited bv Jian Guangyi, China Electric Power Press, first edition and first printing in Aug. 2005, the title page, the copyright information page, the preface, the table of contents, p. 43, see partial translation.
Basis for Material Science, edited by Zhao Pin et al., Harbin Institute of Technology Press, first edition and first printing in Aug.

(56) References Cited

OTHER PUBLICATIONS 1999, the title page, the copyright information page, the preface, the foreword, the table of contents, p. 177-178.

Isothermal Transformation Curve of Steel, edited by Yang Kegong, Heilongjiang People's Publishing House, first edition and first printing in Aug. 1981, the title page, the copyright information page, the preface, the table of contents and partial translation.

Heat Treatment of Iron and Steel—Principle and Application, editing group of the Heat Treatment of Iron and Steel, Shanghai Scientific and Technical Publishers, first edition and first printing in Jan. 1979, the title page, the copyright information page, the preface, the table of contents, pp. 20-23 and partial translation.

Heat-Assisted Forming Theory for Sheet Metals, edited by Min Junying et al, Tongji University Press, first edition and first printing in Aug. 2014, the title page, the copyright information page, the preface, the table of contents, p. 70 and partial translation.

Basic Investigations on the Hot Stamping Steel 22MnB5, M.Geiger et al., Advanced Materials Research, vols. 6-8 (May 2005) pp. 795-802.

Translation of Fundamentals of Material Science, Pan Jinsheng et al., Tsinghua University Press, first edition in Jun. 1998 and fourth printing in Aug. 2003, the cover, the title page, the copyright information page, the catalogue, pp. 593-597.

Fig. 3  10μm
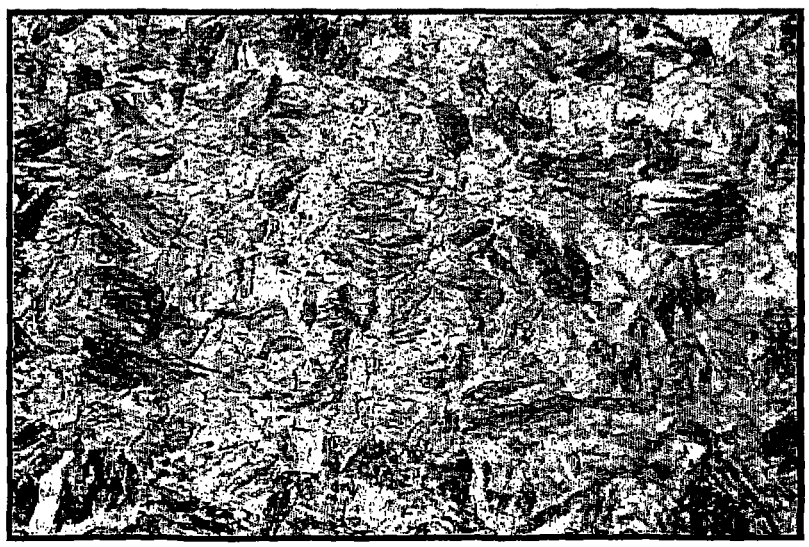
Fig. 4  10 μm

COATED STEEL STRIPS, COATED STAMPED PRODUCTS AND METHODS

CROSS REFERENCE TO RELATED APPLICATIONS

This is a Continuation of U.S. patent application Ser. No. 16/413,825 filed May 16, 2019, now U.S. Pat. No. 11,041,226, which is a Continuation of U.S. patent application Ser. No. 15/606,770 filed May 26, 2017, now U.S. Pat. No. 10,550,447, which is a Continuation of U.S. patent application Ser. No. 13/621,015, filed Sep. 15, 2012, now U.S. Pat. No. 9,708,683, which is a Divisional of U.S. patent application Ser. No. 12/447,777, filed Apr. 29, 2009, now U.S. Pat. No. 8,307,680, which is a National Phase Application of International Patent Application PCT/IB06/004019, filed Oct. 30, 2006. All of the above patent applications are hereby incorporated by reference herein.

The present invention relates to, among other things, coated steels, methods of making such coated steels, including hot dipping, methods of using such coated steels, stamping blanks prepared from coated steels, stamped products prepared from coated steels, and to various uses of the invention products such as in spot welding, etc.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

BACKGROUND OF THE INVENTION

In recent years the use of pre-coated steels in hot-stamping processes for the shaping of parts has become important, especially in the automotive industry. Fabrication of such parts may include the following main steps:

Pre-coating of a steel sheets, by hot dipping;

Trimming or cutting for obtaining blanks;

Heating the blanks in order to obtain alloying of the steel substrate with the pre-coating, as well as the austenitizing of the steel; and Hot forming followed by rapid cooling of the part in order to obtain predominantly martensitic structures, See for Example U.S. Pat. No. 6,296,805, incorporated herein by reference.

Thanks to an alloying of the pre-coating with the steel substrate, which has the effect of creating intermetallic alloys with high melting temperature, the blanks having such coating may be heated in a temperature range where austenitizing of the metallic substrate takes place, allowing further hardening by quenching.

Heat treatments of the blanks in view of the intermetallic alloying of the coating and austenitizing of the substrate are most frequently performed in furnaces, where blanks are traveling on rollers. The thermal cycles experienced by the blanks include first a heating phase whose rate is a function of parameters such as blank thickness, furnace temperature, traveling speed, and coating reflectivity. After this heating phase, thermal cycles generally include a holding phase, whose temperature is the regulation temperature of the furnace. Problems however are experienced with the furnace operation: the rollers may become fouled by metallic deposits which come from the pre-coating of the blanks. If these deposits are excessive, maintenance of the rollers has to be performed and productivity is decreased.

Parts obtained after heating and rapid cooling display very high mechanical resistance and may be used for structural applications, for example for automotive industry applications. These parts must be frequently welded with others and high weldability is required. This means that:

The welding operation should be performable in a sufficiently wide operating range in order to guarantee that an eventual drift of the nominal welding parameters has no incidence on weld quality. For resistance welding, which is very common in the automotive industry, an operating welding range is defined by the combination of parameters: welding current intensity and force F applied of the parts during welding being among the most important. A proper combination of these parameters helps to ensure that insufficient nugget diameter is not obtained (caused by too low intensity or too low force) and that no weld expulsion occurs.

The welding operation should also be performed in such a way that high mechanical resistance is obtained on the weld. This mechanical resistance may be evaluated by tests such as by shear-tensile tests or cross-tensile tests.

SUMMARY OF THE INVENTION

There remains a need for coated steels which may be conveniently used to prepare shaped parts by a stamping process. There also remains a need for coated steels which may be used to prepare shaped parts by a stamping process which are suitable for welding. There also remains a need for processes for preparing such coated steels and stamped parts.

The inventors have discovered that certain coated steels in which a base steel strip is at least partially coated (sometimes termed "pre-coated," this prefix indicating that a transformation of the nature of the pre-coating will take place during heat treatment before stamping) on at least one side with a coating of either aluminum or an aluminum alloy and in which the coating has a defined thickness and is preferably substantially uniform, are conveniently formed into shaped parts after heating by stamping and are conveniently welded. In addition, the inventors have discovered that the roller fouling problem described above generally arises from an insufficient degree of intermetallic alloying between the substrate and the metallic pre-coating. Furthermore, it was discovered that the location of the fouling of the rollers corresponds to zones of the blanks in contact with the rollers where the metallic pre-coating thickness locally exceeds the average thickness. While not bound by a particular theory, it is believed that if a pre-coating is locally too thick, intermetallic alloying is insufficient and the pre-coating melts, fouling the rollers. Thus, the inventors have discovered that the control of the homogeneity of the pre-coating thickness over the entire sheet within given tolerances is an important factor for obtaining the desired degree of intermetallic alloying, allowing one to improve the resistance to the subsequent melting of the coating during travel on rollers.

The inventors have also discovered that particularly good weldability of aluminized and hot stamped parts is associated with a special succession of coating layers on the parts, proceeding from steel substrate outwards.

The inventors have also discovered that a specific combination of transfer time between the heating furnace and the stamping die, the amount of deformation during stamping, the temperature of stamping, the cooling rate of the product during stamping, leads to the fabrication of a part with a fully homogeneous martensitic structure and that an increase in ductility or energy absorption of the parts after stamping is obtained by a reduction of sulfur below a critical value, these two benefits being obtained with or without the invention aluminum/aluminum alloy coating, and with other coatings.

Accordingly, and in view of the above, it is one object of the present invention to provide novel pre-coated steels strips which may be conveniently processed into stamping blanks.

It is another object of the present invention to provide novel pre-coated steels strips or sheets which may be conveniently formed into parts by stamping.

It is another object of the present invention to provide novel coated steels which may be conveniently formed into parts by hot stamping.

It is another object of the present invention to provide novel methods for making such a coated steel.

It is another object of the present invention to provide novel stamping blanks which are prepared from such a coated steel.

It is another object of the present invention to provide novel methods of making such stamping blanks.

It is another object of the present invention to provide novel stamped parts which are prepared from such a coated steel.

It is another object of the present invention to provide novel methods of making such stamped parts.

It is another object of the present invention to provide novel articles of manufacture, such as a motor vehicle, which contain such stamped parts.

It is another object of the present invention to provide novel stamped parts.

It is another object of the present invention to provide novel methods of making welded stamped parts.

It is another object of the present invention to provide novel articles of manufacture, such as a motor vehicle, which contain such welded stamped parts.

It is another object of the present invention to provide novel welded coated steels and welded stamping blanks.

It is another object of the present invention to provide novel methods of making such welded coated steels and welded stamping blanks.

These and other objects, which will become apparent during the following detailed description.

BRIEF DESCRIPTION OF THE DRAWINGS

FIG. 3 illustrates a microstructure of a steel part, hot stamped and cooled under conditions not according to the invention.

FIG. 4 illustrates the microstructure of a steel part, hot stamped and cooled according to a preferred set of conditions according to the invention.

DETAILED DESCRIPTION OF THE PREFERRED EMBODIMENTS

Figure 1:
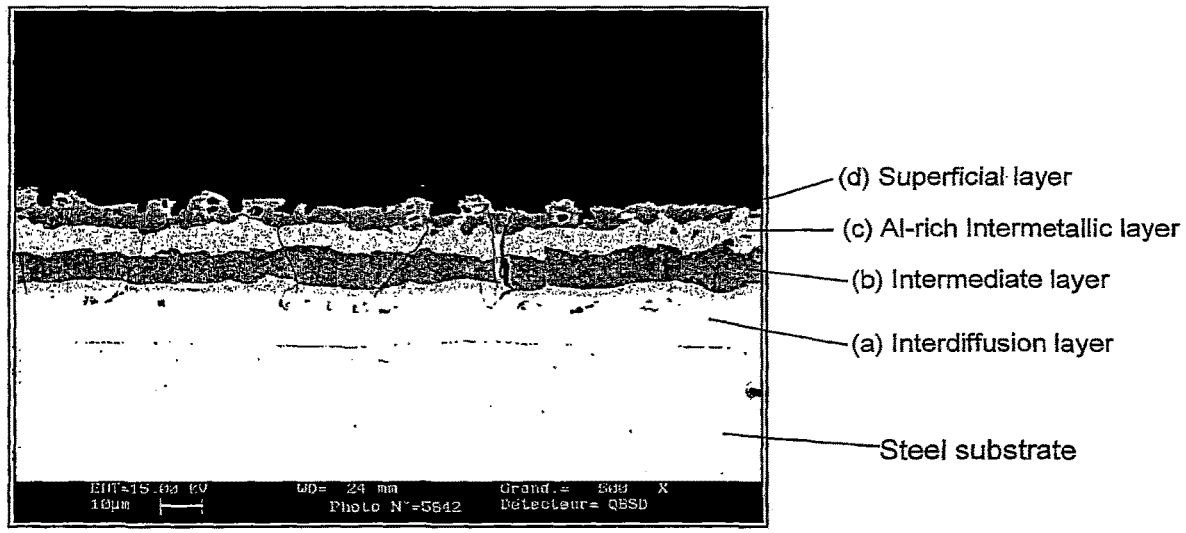
FIG. 1 illustrates a preferred embodiment of an invention coated part, after heat treatment and stamping. The succession of layers of the coating on the steel substrate is: (a) interdiffusion layer; (b) intermediate layer; (c) Intermetallic layer; and (d) superficial layer. This arrangement is particularly favorable for the further welding of the part.
Figure 2:
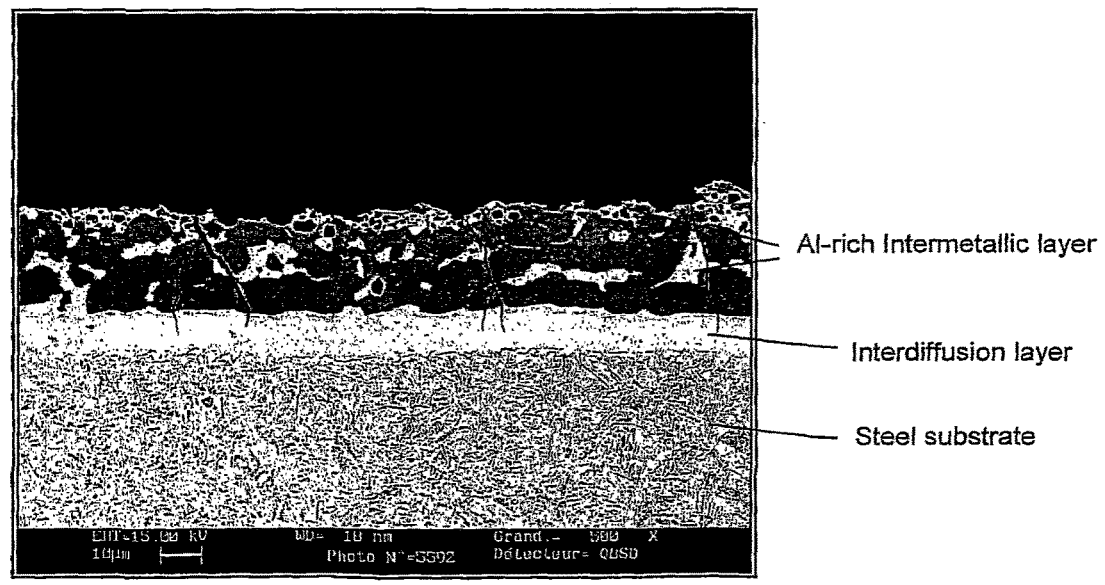
FIG. 2 illustrates a coating of a steel substrate after heat treatment and stamping which does not correspond to the invention. This succession of layers (interdiffusion layer and intermetallic layer) yields inferior results in resistance spot welding.
Figure 5:
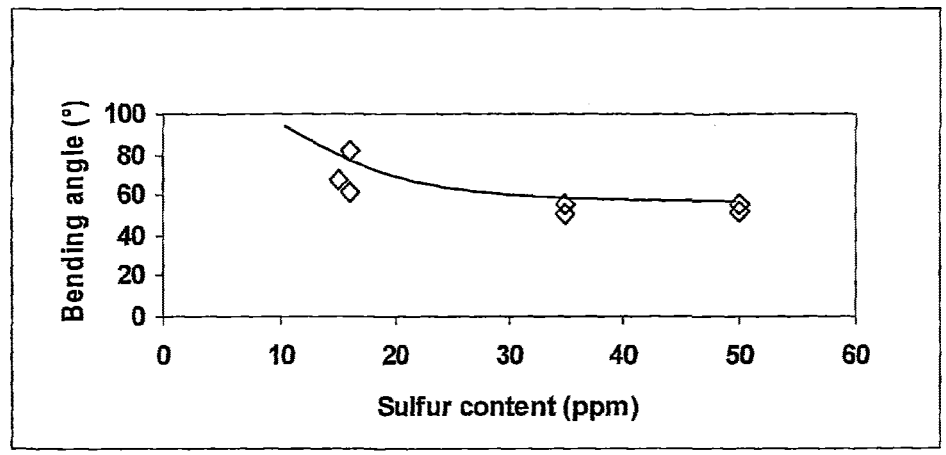
FIG. 5 illustrates the influence of sulfur on the bending angle of parts after hot stamping.

As noted above, the inventors' discovery that certain coated steels, in which a base steel is at least partially pre-coated on at least one side with a coating of either aluminum or an aluminum alloy and in which the pre-coating has a defined thickness and is substantially uniform, are conveniently formed into shaped parts by stamping, forms one basis for the invention.

In the context of the present invention, the terms first side (or side 1) and second side (or side 2) of the strip or sheet, etc., of base steel refer to the two large, opposite-facing, surfaces which have a surface area defined by the length and width of the strip of base steel. In contrast, the side edges of the strip of base steel are the two small, opposite-facing, surfaces which have a surface area defined by the length and thickness of the strip. The top and bottom edges of the strip of base steel are the two small, opposite-facing, surfaces which have a surface area defined by the width and thickness of the strip. In the following, $t_p$ designates the thickness of the pre-coating, at any considered location on the sides 1 and 2 of a sheet or a blank. In particular, in the case of sheets coated on two sides 1 and 2, $t_p1$ stands for the thickness on side 1, and $t_p2$ for the thickness on side 2.

According to a highly preferred embodiment $t_p$ is controlled in a precise range, expressed by $(t_{pmin}, t_{pmax})$ in order to improve the resistance to the fouling of the rollers. The thickness is preferably controlled, both in the longitudinal (or rolling) direction of the strip or sheet, as well in the transverse direction.

In relation to the problem of the fouling of rollers, the control of the pre-coating thickness on the side of the sheet or blank which is directly in contact with the rollers is especially important. Because different operations can follow the step of coating the steel sheet (for example hot-dip-coating which provides coated sides 1 and 2), it is preferable to carefully control the pre-coating on both sides of the sheet. For example, after any of coiling, handling, cutting, punching, etc., sides 1 and 2 may be not readily identifiable. But when control of $t_p$ is effected on the two sides of the sheet that has been coated (first side and second side) it is not necessary to track sides 1 and 2 as neither side will foul the roller. In addition, it is not necessary to trim the sheet in order to obtain a preferred smaller sheet having a more uniform homogeneity of pre-coating thickness, thus providing a sheet that is pre-coated by, e.g., hot-dipping. In other words, important benefits are obtained when one controls the pre-coating minimum and maximum thickness of the first side $(t_{pmin1}, t_{pmax1})$ and the pre-coating minimum and maximum thickness of the second side $(t_{pmin2}, t_{pmax2})$ of the subject steel sheet or blank.

Hot-dip coated steels are the preferred steels herein. However, regardless of the coating method, the pre-coating thickness on one or both sides of the sheet can be measured and monitored continuously on a coating line directly after the coating operation. This may be realized by devices known per se, such as thickness gages relying on X-Ray absorption. At every moment, the measurement of thickness at a given location may be performed for example on an area of a few hundreds of mm.sup.2, this representing the dimension of the zone irradiated by X-Ray.

In a preferred embodiment, a plurality of such devices are positioned at different distances in the transverse direction of the strip in order to obtain a profile of the thickness of the pre-coating along the strip width.

The inventors have discovered that the resistance to the pollution or fouling of the rollers in the furnaces is improved when the minimum and maximum thickness respectively of at least one of the first side ($t_{pmin1}$, $t_{pmax1}$) and the second side ($t_{pmin2}$, $t_{pmax2}$) are respectively equal to 20 and 33 micrometers (a micrometer is the same as a micron and is a metric unit of length equal to one millionth of a meter). In other words, in a preferred embodiment, at every location on at least one face of the sheet or the blank, the thickness $t_p$ of the pre-coating is preferably from 20-33 micrometers in thickness, including 21, 22, 23, 24, 25, 26, 27, 28, 29, 30, 31 and 32 micrometers and all ranges and subranges therebetween, and including all numbers between each listed value as if written out in its entirety (e.g., 22.34 micrometers). For hot-dip coating, precise control of this range of pre-coating thickness can be realized on an operating line for example using a system of nozzles blowing gas after coating, for example after exit of the strip or sheet from a bath, and by the flatness of the strip. Number, geometry and location of the nozzles, and flow rates are among the main parameters for a precise control of the thickness $t_p$. Given the present disclosure, one of ordinary skill in this art can control the pre-coating thickness as described herein without undue labor.

The invention refers to strips produced in industrial conditions, i.e. where control of pre-coating thickness is effective over a wide surface strip, i.e. with a length greater than 100 m, and with a width greater than 600 mm. In such a way, blanks cut or trimmed out these strips display very high homogeneity of pre-coating thickness, and the settings of the heating treatments in the furnace do not have to be changed for being adapted to eventual variations of this thickness.

While not bound by a particular theory of operation, the inventors believe that several of the benefits of the invention are related to this pre-coating thickness range, such as the following:

For a pre-coating thickness less than 20 micrometers, the alloyed layer which is formed during the heating of the blank has an insufficient roughness. Thus, the adhesion of subsequent painting is low on this surface, and the corrosion resistance is decreased.

If the pre-coating thickness is more than 33 micrometers at a given location on a sheet, the risk is that the difference of thickness between this location and some other locations where the pre-coating is thinner, becomes too important: The settings of the heating treatment in the furnace may be adapted to the thinner value of the pre-coating, but not to the thicker one. Thus, the alloying reaction forming the intermetallic alloy may take place to an insufficient degree since the mean diffusion distance of the elements in the pre-coating becomes significantly less than the local value of the pre-coating thickness. As a matter of results, alloying will become much more difficult in the external (or superficial) part, particularly in the case of high heating rate.

Thus, in a first embodiment, the present invention provides certain coated steel strips, which comprise a strip of base steel and a pre-coating of aluminum or an aluminum alloy on at least a part of one side of the strip of the base steel. For many applications, the strip of base steel may comprise any type of steel which may be coated with either aluminum or an aluminum alloy. However, for certain applications, such as a structural part of an automobile, it is preferred that the strip of base steel comprise an ultra high strength steel (UHSS). In such cases, it is particularly preferred that the strip of base steel comprises a boron steel.

Figure 7:
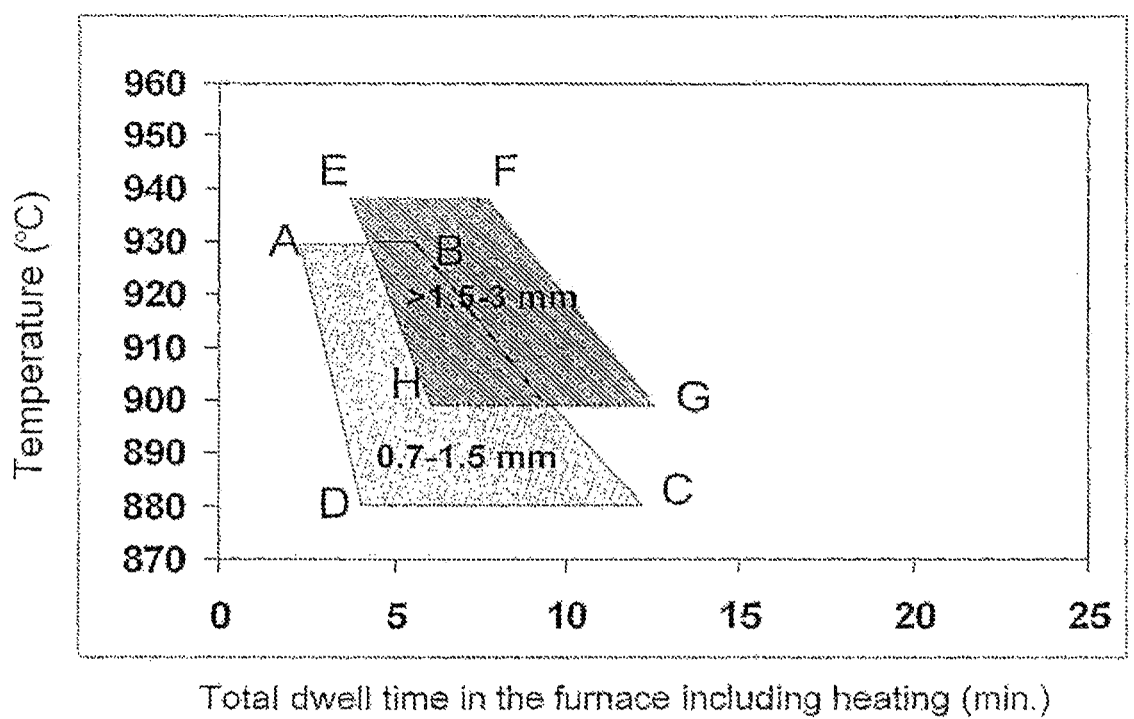
FIG. 7 shows conditions of furnace temperature as a function of the total dwell time in the furnace for sheets of total thicknesses of from 0.7-1.5 and 1.5-3 mm that provide particularly favorable coatings for welding.

The inventors have also discovered that good welding results are achieved if the coating obtained on parts made out of blanks having undergone intermetallic alloying, austenitizing and hot stamping, displays distinctive features. It must be pointed out that this coating is different from the initial pre-coating, since the thermal treatment causes an alloying reaction with the steel substrate which modifies both the physico-chemical nature and the geometry of the pre-coating: in this regard, the inventors have discovered that particularly good weldability of aluminized and hot stamped parts is associated with the following succession of coating layers on the parts, proceeding from steel substrate outwards:

(a) Interdiffusion layer,
(b) Intermediate layer,
(c) Intermetallic layer,
(d) Superficial layer See, e.g., FIG. 1. In a preferred embodiment these layers are as follows:

(a) Interdiffusion layer, preferably with medium hardness (e.g., HV50g between 290 and 410, HV50g designating the hardness measured under a load of 50 grams) In a preferred embodiment this layer has the following composition, by weight: 86-95% Fe, 4-10% Al, 0-5% Si (b) Intermediate layer (HV50g around 900-1000 e.g., +/−10%)) In a preferred embodiment this layer has the following composition, by weight: 39-47% Fe, 53-61% Al, 0-2% Si (c) Intermetallic layer, with hardness HV50g around 580-650, e.g., +/−10%) In a preferred embodiment this layer has the following composition, by weight: 62-67% Fe, 30-34% Al, 2-6% Si (d) Superficial layer (HV50g around 900-1000 e.g., +/−10%)) In a preferred embodiment this layer has the following composition, by weight: 39-47% Fe, 53-61% Al, 0-2% In a preferred embodiment the total thickness of layers (a) to (d) is greater than 30 micrometers. In another preferred embodiment, the thickness of layer (a) is less than 15 micrometers, for example 14, 12, 8, 6, 4, 2, or 1 micrometers, and all whole numbers, ranges and subranges therebetween, and including all numbers between each listed value as if written out in its entirety (e.g., 13.84 micrometers The inventors have discovered that high weldability is especially obtained when layers (c) and (d) are essentially continuous (i.e.: occupying at least 90% of the level corresponding to the considered layer) and when less than 10% of layer (c) is present at the extreme surface of the part. Without being bound by a theory, it is thought that this particular layer disposal, in particular layer (a) and, layers (c) and (d) influence the resistivity of the coating both by their intrinsic characteristics and by the effect of roughness. Thus, current flow, heat generation at the surfaces, and nugget formation in the initial stage of spot welding are affected by this particular arrangement. This favorable layer disposition is obtained for example when aluminum- or aluminum alloy pre-coated steel sheets, whose thickness range from, e.g., 0.7 to 3 mm, are heated for 3 to 13 minutes (this dwell time includes the heating phase and the holding time) in a furnace heated to a temperature of 880 to 940° C. Other conditions leading to such favorable layer dispositions are found in FIG. 7:

For sheets of total thicknesses greater or equal to 0.7 mm, and less than or equal to 1.5 mm, the preferred treatment conditions: (furnace temperature, total dwell time in the furnace) are illustrated in FIG. 7 by conditions lying within the limits of diagram "ABCD." For sheets of total thicknesses greater than 1.5 mm, and less than or equal to 3 mm, the preferred treatment conditions: (furnace temperature, total dwell time in the furnace) are illustrated in FIG. 7 by diagram "EFGH". The heating rate $V_c$ is comprised between 4 and 12° C./s for producing a favorable alloyed layer disposition. In this regard, this "heating rate" reflects the temperature rise which is experienced by the pre-coated steel upon being located in the preheated furnace. $V_c$ is defined as the mean heating rate between 20 and 700° C. The inventors have discovered that the control of $V_c$ in this precise range is a key factor, because it controls directly the nature and the morphology of the alloyed layers which are formed. It is here underlined that the heating rate $V_c$ is different from the mean heating rate, which is the heating rate between room temperature and furnace temperature. The rates of 6, 7, 8, 9, 10, and 11° C./s are included as are all numbers, ranges and subranges therebetween, and including all numbers between each listed value as if written out in its entirety (e.g., 7.7° C./s). In this regard, all of the conditions specified within FIG. 7 are incorporated herein by reference thereto. Particularly preferred conditions are:

(for thicknesses of 0.7-1.5 mm)
930° C., from 3 minutes up to 6 minutes;
880° C., from 4 minutes 30 seconds up to 13 minutes (for thicknesses of 1.5 to 3 mm)
940° C., from 4 minutes up to 8 minutes;
900° C., from 6 minutes 30 seconds up to 13 minutes.

A special advantage arises from pre-coatings whose thickness is comprised between 20 and 33 micrometers, since this thickness range yields favorable layer disposal, and since the homogeneity of the pre-coating thickness is associated to an homogeneity of the coating formed after alliation treatment.

Heated blanks are thereafter transferred to a die, hot stamped to obtain a part or product, and cooled at a rate of more than 30.degree.C./s, The cooling rate is defined here as the mean rate between the exit of the heated blank from the furnace, down to 400° C.

The strip of base steel is coated with either aluminum or an aluminum alloy. Commercially pure aluminum is known in the art as Type 2 aluminum, while alloys of aluminum with 5 to 11% by weight of silicon are known in the art as Type 1 aluminum. Silicon is present in order to prevent the formation of a thick iron-metallic intermetallic layer which reduces adherence and formability. Other alloying elements useful with aluminum herein include iron, between 2.5 and 3% by weight, and calcium, between 15 and 30 ppm by weight, including combinations of two or more thereof with aluminum.

A typical metal bath for an Al—Si coating generally contains in its basic composition by weight, from 8% to 11% silicon, from 2% to 4% iron, the remainder being aluminum or aluminum alloy, and impurities inherent in processing. Typical composition of Al—Si coating is: Al-9.3% Si-2.8% Fe. Invention coatings are not limited to these compositions, however.

The strip of base steel used herein may be any which can be coated by a conventional coating technique. For example, the strip of base steel may be any hot rolled strip, such as those prepared by hot rolling a steel slab (either with or without subsequent cold rolling). Typically, the strip of base steel will be stored and transported in the form of a coil both before and after the formation of the coating.

An example of a preferred steel for the strip of base steel is one having the following composition by weight:
0.10%<carbon<0.5%
0.5%<manganese<3%
0.1%<silicon<1%
0.01%<chromium<1%
titanium<0.2%
aluminum<0.1%
phosphorus<0.1%
sulfur<0.05%
0.0005%<boron<0.010%, the remainder comprising, consisting essentially of, or consisting of iron and impurities inherent in processing. Use of such a steel provides a very high mechanical resistance after thermal treatment and the aluminum-based coating provides a high resistance to corrosion.

Particularly preferably, the composition by weight of the steel in the strip of base steel is the following:
0.15%<carbon<0.25%
0.8%<manganese<1.8%
0.1%<silicon<0.35%
0.01%<chromium<0.5%
titanium<0.1%
aluminum<0.1%
phosphorus<0.1%
sulfur<0.05%
0.002%<boron<0.005%, the remainder comprising, consisting essentially of, or consisting of iron and impurities inherent in processing.

A preferred strip herein is 100 m long and 600 mm wide. Preferred thicknesses are 0.7 to 3 mm.

Even more preferably, in the composition by weight of the sheet, the weight ratio of titanium content with respect to the nitrogen content is in excess of 3.42, believed to be a level which the boron is no longer able to combine with the nitrogen.

An example of preferred commercially available steel for use in the strip of base steel is 22MnB5.

Chromium, manganese, boron and carbon may be added, in the composition of the steel according to the invention, for their effect on hardenability. In addition, carbon makes it possible to achieve high mechanical characteristics thanks to its effect on the hardness of the martensite.

Aluminum is introduced into the composition, to perform deoxidation in the liquid state and to protect the effectiveness of the boron.

Titanium, the ratio of the content of which with respect to the nitrogen content should be in excess of 3.42, is introduced for example in order to prevent combining of the boron with the nitrogen, the nitrogen being combined with titanium.

The alloying elements, Mn, Cr, B, make possible a hardenability allowing hardening in the stamping tools or the use of mild hardening fluids limiting deformation of the parts at the time of thermal treatment. In addition, the composition according to the invention is optimized from the point of view of weldability.

The steel in the sheet may undergo a treatment for globularization of sulfides performed with calcium, which has the effect of improving the fatigue resistance of the sheet.

As mentioned above, ultra-high-strength can be provided with the steel sheet coated and hot stamped according to the invention. This high level of strength is sometimes associated with a limited ductility. In applications requiring a higher ductility, in particular when an ability for bending is required from a part or a product, the inventors have discovered that increased ductility can be obtained if sulfur is particularly controlled: when the sulfur level of base steel is lower than or equal to 0.002% (20 ppm), the bending angle can be greater than 60° and enhanced ductility and tearing resistance are obtained on the parts having experienced heat treatment and stamping. Preferred levels include 20, 18, 15, 13, 10, 8, 5, etc ppm sulfur. In fact, this benefit applies to steels in general, and is not limited to coated steels or to steels coated with Al or Al alloy coatings. While not bound by a particular theory, when analyzing causes of premature failure of some parts in bending operations, the inventors observed that failure initiated on sulfide inclusions. It is thus believed that decohesions between inclusions and the martensitic or bainito-martensitic matrix act as stress-concentration factors and trigger further crack propagation in the ductile mode.

The invention also concerns a process for producing a part starting from an invention coated sheet, then cut into a blank which, after shaping, the coating of the blank is subjected to an increase in temperature at a speed in excess of 4° C./second, but lower than 12° C./second. The heating rate $V_c$ is defined as the mean rate between 20 and 700° C.

The invention also concerns the use of a hot-rolled steel sheet which then can be cold-rolled and coated, for structural and/or anti-intrusion or substructure parts for a land motor vehicle, such as, for example, a bumper bar, a door reinforcement, a wheel spoke, etc.

The sheet according to the invention described above can derive, by reason of its processing, from a hot-rolling mill, and possibly may be cold-rerolled again depending on the final thickness desired. It then is coated with an aluminum-based coating, for example by dipping in a bath containing, in addition to the aluminum source/alloy, e.g., from 8% to 11% silicon and from 2% to 4% iron, the sheet having a high mechanical resistance after thermal treatment and a high resistance to corrosion, as well as a good capacity for painting and gluing.

The coating is preferably controlled as above, and has in particular the function of protecting the basic sheet against corrosion in various conditions. The thermal treatment applied at the time of a hot-forming process or after forming makes it possible to obtain high mechanical characteristics which can exceed 1500 MPa for mechanical resistance and 1200 MPa for yield stress. The final mechanical characteristics are adjustable and depend in particular on the martensite fraction of the structure, on the carbon content of the steel and on the thermal treatment. At the time of thermal treatment performed on a finished part or at the time of a hot-shaping process, the coating forms a layer having a substantial resistance to abrasion, wear, fatigue, shock, as well as a good resistance to corrosion and a good capacity for painting and gluing. The coating makes it possible to avoid different surface-preparation operations such as for steel sheets for thermal treatment not having any coating.

The steel sheet can be pre-coated by dipping, after pickling, in an aluminum bath containing for example only aluminum or either aluminum and from 8% to 11% silicon and 2% to 4% iron, or only from 2% to 4% iron, or even in an aluminum bath preferably containing from 9% to 10% silicon and 2% to 3.5% iron. The aluminum may be aluminum per se or an aluminum alloy.

In an example of implementation of a coating of the sheet by dipping in a metal bath containing an aluminum alloy comprising a proportion of approximately 90% aluminum, the coating layer comprises a first alloy layer in contact with the surface of the steel. This layer, directly in contact with the surface of the sheet, is highly alloyed with iron.

A second coating layer, on top of the first, contains approximately 90% aluminum and may contain silicon and a small amount of iron, depending on the composition of the bath.

The first alloy layer may crack when the sheet is submitted to high strains during cold forming operations of the manufacture of parts.

According to the invention, after the forming of the part, the coating is subjected to an increase in temperature at a speed in excess of 4° C./second. This rise in temperature makes possible a rapid remelting of the aluminum which fills in the cracks generated by the operation of shaping of the part.

At the time of thermal treatment, the base coating, of aluminum for example, is transformed into a layer alloyed with iron and comprising different phases depending on the thermal treatment and having a considerable hardness which may exceed 600 HV50 g.

Another advantage of the invention lies in the fact that the diffusion of the iron in the coating is initiated at high temperature. One thus will have a better cohesion between coating and steel in the sheet. In another form of the invention, the thermal treatment may be performed locally, in heavily deformed zones.

According to the invention, the sheet, in the delivery state in a coil or in a is sheet, the thickness of which may range between 0.25 mm and 15 mm, has good forming properties and a good resistance to corrosion as well as a good capacity for painting or gluing. Preferably, the steel sheet or blank has a thickness less than 3 mm, since the cooling rates that may be achieved after quenching are high and help to obtain martensitic structures.

The steel sheet, a coated product, has a substantial resistance to corrosion in the delivery state, during forming and thermal treatments as well as during usage of the finished part. The presence of the coating at the time of thermal treatment of the parts makes it possible to prevent any decarburization of the base metal as well as any oxidation. That is an undeniable advantage, in particular in the case of hot forming. Furthermore, heating of the treated part does not require a furnace having a controlled atmosphere to prevent a decarburization.

Thermal treatment of the metal in the sheet comprising heating at a temperature ranging between Ac1, starting temperature of austenitic transformation when heating, for example 750° C. and 1200° C., in a furnace, for a period which depends on the temperature to be reached and the thickness of the blank. The composition is optimized so as to limit the grain growth at the time of thermal treatment. If the structure sought is completely martensitic, the holding temperature should be in excess of Ac3, for example 840° C., temperature of complete austenitic transformation. The temperature holding should be followed by a cooling adjusted to the final structure sought.

Blanks are thereafter transferred from the furnace to a stamping press. When the elapsed time between the exit of the blanks from the furnace and the introduction in the stamping press is more 10 seconds, a partial transformation from austenite is susceptible to appear: if obtaining a full martensitic structure is desired, the transfer time between the exit of the furnace and stamping should be less than 10 s.

The inventors have also discovered that the obtaining of a fully martensitic structure is linked to the amount of deformation in the hot forming operation: the amount of local deformation caused by hot forming is closely linked to the shape of the part or product and may exceed locally 40 or 50% in some particular regions. The inventors found that, when the local strain exceeds a critical value of 10%, the cooling rate must be sufficiently high in order to get a total martensitic transformation. Otherwise, bainitic transformation can take place at a significant amount instead of martensitic transformation. Thus, the risk is that heterogeneous structure appears on parts with complex shape where some locations are much more deformed than others. In this respect, the inventors put into evidence that, on the locations of the parts where the forming strain is higher than 10%, the cooling rate must be increased beyond 50° C. is in order to guarantee full martensitic transformation. The cooling rate is defined as the mean rate between the exit of the heated blank from the furnace, down to 400° C.

But one may also seek to obtain ferrite-bainitic or ferrite-martensitic structures, by a heating at a temperature ranging between Ac1, for example 750° C. and Ac3, for example 840° C., followed by an appropriate cooling. According to the level of resistance to be achieved and the thermal treatment applied, one or several of these constituents is/are present in variable proportions.

The modulation of thermal treatment parameters makes it possible to achieve, with a given composition, different levels of hot and cold sheet resistance according to the thickness sought. For the highest resistance levels, the structure is composed predominantly of martensite.

The steel is particularly suited to the production of structural and anti-intrusion parts.

The invention thus enables one to produce a hot- or cold-rolled steel sheet of a desired thickness, coated, and affording extensive forming possibilities and which, after thermal treatment performed on the finished part, makes it possible to obtain a mechanical resistance in excess of 1000 MPa, a substantial resistance to shocks, fatigue, abrasion and wear, while retaining a good resistance to corrosion as well as a good capacity for welding, painting and gluing.

The present invention is described by way of certain exemplary embodiments which are not intended to be limiting.

EXAMPLES

Example 1

In a first example of implementation, a cold rolled steel sheet, 1.9 mm thick, containing by weight 0.23% carbon, 1.25% manganese, 0.017% phosphorus, 0.002% sulfur, 0.27% silicon, 0.062% aluminum, 0.021% copper, 0.019% nickel, 0.208% chromium, 0.005% nitrogen, 0.038% titanium, 0.004% boron, 0.003% calcium—has been pre-coated with an aluminum-based alloy with composition 9.3% silicon, 2.8% iron, the remainder being aluminum and unavoidable impurities. According to the conditions of fabrication, namely the settings of the blowing devices on the operating line, sheets of 120 m long and 650 mm wide with various thickness ranges were produced.

Sheet A (according to the invention): The thickness $t_p1$ and $t_p2$ on each side of the sheet was controlled to be within the range (20-33) micrometers, at every location of the two faces of the sheet, both in the longitudinal (or rolling) direction and in the transversal direction. Measurement was performed continuously with thickness gages devices relying on X-Ray emission. At every moment, the spot of measurement of each gage was a circular zone of about 20 mm radius. The sheets were afterwards cut into blanks of 1.2.times.0.5 m.sup.2 of overall dimensions.

Sheet B (reference): On these sheets, the pre-coating thickness had a wider variability since the thickness tp1 and tp2 on the two sides of the sheet was comprised in the range (30-45) micrometers. Blanks cut out of these sheets exhibit the same pre-coating thickness.

The blanks were then submitted to heating in a furnace at T=920° C. Heating time was 3 min, with 4 mn holding time. The microstructure is then fully austenitic. Blanks were thereafter transferred from the furnace to a stamping press. When the elapsed time between the exit of the blanks from the furnace and the transfer in the stamping press is more 10 seconds, a partial transformation from austenite was susceptible to appear, thus reducing the mechanical resistance of the stamped part.

The blanks were directly cooled afterwards without hot stamping in order to appreciate the eventual remelting of the coating. On series A, no melting of the pre-coating was found. Intermetallic alloying between the pre-coating and the steel substrate occurred completely. On series B, the pre-coating underwent mainly alloying, but some traces of remelting were found, particularly on the former thicker locations of the pre-coating. This partial remelting of the aluminium pre-coating contributes to the progressive fouling of the rollers in the furnace. The sheets according to the invention do not contribute to this progressive buildup on the rollers.

Example 2 i) Conditions according to the invention: In a second example of implementation, a cold rolled steel sheet, 1.2 mm thick, 120 m long and 650 mm wide, with same composition and same pre-coating as in example 1, has been fabricated. The sheets were afterwards cut into blanks which were heated at 920° C. for 6 mn, this time including the heating phase and the holding time. Heating rate $V_c$ between 20 and 700° C. was 10° C./s. The blanks were finally hot stamped and quenched in order to obtain full martensitic structures. The parts obtained after hot-stamping are covered by a coating, 40 micrometers thick, illustrated at FIG. 1, which has a four layer structure. Starting from the steel substrate, the layers are the following:

(a) Interdiffusion layer or intermetallic layer, 17 micrometers thick. This layer is itself composed of two sub-layers. Hardness HV50g ranges from 295 to 407, and the mean composition is: 90% Fe, 7% Al, 3% Si.

(b) Intermediate layer, appearing darker, 8 micrometers thick. This layer has a hardness of 940HV50g and a mean composition, by weight: 43% Fe, 57% Al, 1% Si.

(c) Intermetallic layer appearing as a pale phase, 8 micrometers thick, displaying a hardness of 610HV50g, a mean composition of 65% Fe, 31% Al, 4% Si (d) Darker superficial layer, 7 micrometers thick, 950 HV50g, with a mean composition of 45% Fe, 54% Al, 1% Si. Layers (c) and (d) are quasi-continuous, i.e. occupying at least 90% of the level corresponding to the considered layer. In particular, layer (c) does not reach the extreme surface except very exceptionally. Anyway, this layer (c) occupies less than 10% of the extreme surface. ii) Conditions of reference: On the other hand, blanks with the same base material and pre-coating parts were furnace-heated in different conditions: The blanks were heated to 950° C. for 7 minutes, this time including the heating phase. Heating rate $V_c$ was 11° C./s. These conditions correspond to a degree of alloying which is more important than in conditions (i).

In this coating, the pale intermetallic layer (c), is not continuous and appears as to be scattered within the coating. About 50% of this layer is present at the extreme surface of the part. Moreover, the interdiffusion layer, 10 micrometers thick in contact with the steel substrate is thinner than in the previous case of FIG. 1.

Resistance spot welding was performed in the two situations i) and ii):

(i): Coating with quasi-continuous layers (c) and (d), layer (c) occupying less than 10% of the extreme surface (ii): Coating with mixed and discontinuous layers, layer (c) occupying more than 10% of the extreme surface. Resistance spot welding was performed by superposing two parts and joining them in the following conditions:

Squeeze force and welding force: 4000 N
Squeeze time: 50 periods
Welding and holding time: 18 periods respectively. In each condition, the suitable intensity range was determined for obtaining:

No sputter during welding

Acceptable nugget size. For the condition i), the weldability range, expressed in terms of current intensity, is 1.4 kA. For the condition ii) the weldability range is extremely small.

Thus, it may be seen that the coating according to the invention, yields much more satisfactory results.

Example 3

In a third example of implementation, a cold rolled steel sheet of the example 1 was cut into blanks of 500.times.500 mm.sup.2 which were heated at 920° C., during 6 mn, then hot stamped and cooled in tools, in such conditions that two different cooling rates were obtained:

(A): Cooling rate: VA=30° C./s (B): Cooling rate: VB=60° C./s Due to the shape of the parts, different deformation levels .epsilon. were created during hot stamping. In particular, some zones largely strained display deformation levels higher than 30%.

As illustrated on FIG. 3, metallographic observations reveal that when .epsilon.>10%, partial bainitic or ferritic transformation occurs on parts cooled with VA=30° C./s, mainly on former austenitic grain boundaries. On the other hand, the parts cooled with VB=60° C./s display fully martensitic microstructure as illustrated on FIG. 4. The latter structures display superior mechanic resistance and a great homogeneity in the case of mechanical solicitation. Thus, even in products or parts where straining is larger than 10%, the application of cooling according to the invention guarantees a microstructural and mechanical homogeneity.

Example 4

Figure 6:
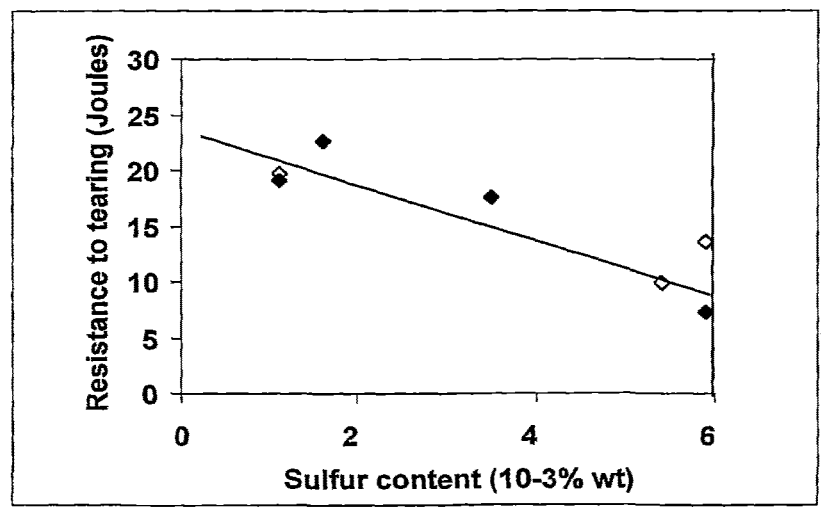
FIG. 6 illustrates the influence of sulfur on the initiation energy of fracture of parts after hot stamping.

In a fourth example of implementation, steel castings containing different values of sulfur, were elaborated. These steels were further hot rolled, then cold rolled steel into sheets, 2.2 mm thick. Sulfur content varies from 11 ppm (0.0011%) to 59 ppm (0.006%) in weight. Apart sulfur, the compositions of these different steel castings comprise in weight: 0.24% carbon, 1.17% manganese, 0.01% phosphorus, 0.25% silicon, 0.045% aluminum, 0.01% copper, 0.02% nickel, 0.2% chromium, 0.04% titanium, 0.003% boron, 0.002% calcium, the remainder being iron and unavoidable impurities. These sheets were pre-coated with an aluminum-based alloy of composition comprising 9.3% silicon, 2.8% iron, the remainder being aluminum and unavoidable impurities. The sheets were afterwards cut into blanks which were heated at 950° C. for 5 mn, then hot stamped and cooled in tools in order to obtain a full martensitic structure. Mechanical resistance exceeded 1450 MPa. Specimens were extracted according to the transverse sense of rolling direction and submitted to a bending test with alternate bending modes. The inventors put into evidence that the critical bending angle (angle at fracture) is closely related to the sulfur content of the steel: when sulfur content is lower than 0.002%, the bending angle exceeds 60°, which indicates higher ductility and energy absorption. Compact Tensile-Test type specimens were also extracted according to the transverse rolling direction in order to measure the resistance to tearing, i.e. the energy which is necessary for the initiation or propagation of an existing crack. The results, illustrated on FIG. 6, indicate that a initiation energy higher than 18 Joules is achieved when sulfur content is lower than 0.002% in weight. As these qualities of high resistance, high energy absorption and weldability are required in automobile industry, the parts or products fabricated according to the invention will be used with profit for such applications.

While the above description is clear with regard to the understanding of the invention, the following terms as used in the following list of preferred embodiments and claims have the following noted meanings in order to avoid any confusion:

pre-coating—the material (Al or Al alloy) coated on or located on at least a portion of the strip or sheet, etc., of base steel to form a pre-coating/base composite, the composite not having been subjected to an alliation reaction between the coated Al or Al alloy material and base steel alliation—a reaction between the pre-coating and base steel, to produce at least one intermediate layer different in composition from both the base steel and the pre-coating. The alliation reaction happens during the heat treatment immediately preceding hot stamping. The alliation reaction affects the total thickness of the pre-coating. In a highly preferred embodiment the alliation reaction forms the following layers: (a) interdiffusion, (b) intermediate, (c) intermetallic, and (d) superficial as described above;

pre-coated steel—the pre-coating/base composite, not having been subjected to an alliation reaction between the coated material and base steel;

coating—the pre-coating after having been subjected to an alliation reaction between the pre-coating and base steel. In a highly preferred embodiment the coating comprises layers (a) interdiffusion, (b) intermediate, (c) intermetallic, and (d) superficial described above;

coated steel or product—the pre-coated steel or product that has been subjected to an alliation reaction between the pre-coating and base steel. In a highly preferred embodiment the coated steel is a strip or sheet, etc., of base steel having thereon an invention coating comprising layers (a) interdiffusion, (b) intermediate, (c) intermetallic, and (d) superficial described above;

blank—a shape cut from a strip.
product—a stamped blank.

What is claimed is:

1. A hot stamped coated steel product, which comprises:
   (a) a strip of base steel having a first side and a second side; and
   (b) a coating on at least one of said first side of said strip of base steel and said second side of said strip of base steel, wherein:
      (i) said coating results from interdiffusion between said base steel and an aluminum or aluminum alloy pre-coating, and (ii) wherein said coating comprises, proceeding from the base steel outwards:
   (a) an Interdiffusion layer,
   (b) an Intermediate layer,
   (c) an Intermetallic layer, and
   (d) a Superficial layer,
      wherein layers (a), (b), (c), and (d) each have a different mean composition from one another,
   wherein said coating of the hot stamped coated steel product has a thickness greater than 30 micrometers.

2. The hot stamped coated steel product according to claim 1, wherein said layer (a) has a thickness that is less than half of said thickness of the coating.

3. The hot stamped coated steel product according to claim 1, wherein layer (a) has an HV50g hardness between 290 and 410; layer (b) has an HV50g hardness between 900 and 1000, +/−10%; layer (c) has an HV50g hardness between 580 and 650, +/−10%; and layer (d) has an HV50g harness between 900 and 1000, +/−10%.

4. The hot stamped coated steel product according to claim 1, wherein said layer (a) has a thickness of 17 micrometers or less.

5. The hot stamped coated steel product according to claim 1, wherein said layer (a) has a thickness of 15 micrometers or less.

6. The hot stamped coated steel product according to claim 4, wherein the coating is 40 micrometers thick.

7. The hot stamped coated steel product according to claim 1, wherein the interdiffusion layer has a first mean iron composition, the intermediate layer has a second mean iron composition less than the first mean iron composition; wherein the intermetallic layer has a third mean iron composition, the third mean iron composition less than the first mean iron composition and greater than the second mean iron composition, and the superficial layer has a fourth mean iron composition, the fourth mean iron composition begin less than the third mean iron composition.

8. The hot stamped coated steel product according to claim 1, wherein layer (a) has a thickness that is greater than a thickness of layer (b).

9. The hot stamped coated steel product according to claim 1, wherein layer (a) has a thickness that is greater than a thickness of layer (c).

10. The hot stamped coated steel product according to claim 1, wherein layer (a) has a thickness that is greater than a thickness of layer (d).

11. The hot stamped coated steel product according to claim 1, wherein layer (a) has a thickness: that is greater than a thickness of layer (b); that is greater than a thickness of layer (c); and that is greater than a thickness of layer (d).

12. The hot stamped coated steel product according to claim 1, wherein layer (a) has a thickness that is more than twice a thickness of layer (b).

13. The hot stamped coated steel product according to claim 1, wherein layer (a) has a thickness that is more than twice a thickness of layer (c).

14. The hot stamped coated steel product according to claim 1, wherein layer (a) has a thickness that is more than twice a thickness of layer (d).

15. The hot stamped coated steel product according to claim 1, wherein the hot stamped coated steel product is fully martensitic.

16. The hot stamped coated steel product according to claim 1, wherein the base steel consists of the following components by weight based on total weight:
   $0.15\% < \text{carbon} < 0.5\%$;
   $0.5\% < \text{manganese} < 3\%$;
   $0.1\% < \text{silicon} < 0.5\%$;
   $0.01\% < \text{chromium} < 1\%$;
   $\text{titanium} < 0.2\%$;
   $\text{aluminum} < 0.1\%$;
   $\text{phosphorus} < 0.1\%$;
   $\text{sulfur} < 0.05\%$;
   $0.0005\% < \text{boron} < 0.08\%$;
   a remainder being iron and impurities inherent in processing.

17. The hot stamped coated steel product according to claim 1, wherein the base steel consists of the following components by weight based on total weight:
   $0.15\% < \text{carbon} < 0.25\%$,
   $0.8\% < \text{manganese} < 1.8\%$,
   $0.10\% < \text{silicon} < 0.35\%$,
   $0.01\% < \text{chromium} < 0.5\%$,
   $\text{titanium} < 0.1\%$
   $\text{aluminum} < 0.1\%$
   $\text{phosphorus} < 0.1\%$
   $\text{sulfur} < 0.05\%$
   $0.002\% < \text{boron} < 0.005\%$,
   a remainder being iron and impurities inherent in processing.

18. The hot stamped coated steel product according to claim 1, wherein the Interdiffusion layer comprises the following components by weight based on total weight: 86 to 95% Fe, 4 to 10% Al, and 0 to 5% Si.

19. The hot stamped coated steel product according to claim 18, wherein the Intermediate layer comprises the following components by weight based on total weight: 39 to 47% Fe, 53 to 61% Al, and 0 to 2% Si.

20. The hot stamped coated steel product according to claim 19, wherein the Intermetallic layer comprises the following components by weight based on total weight: 62 to 67% Fe, 30 to 34% Al, and 2 to 6% Si.

21. The hot stamped coated steel product according to claim 20, wherein the Superficial layer comprises the following components by weight based on total weight: 39 to 47% Fe, 53 to 61% Al, and 0 to 2% Si, and wherein said layer (a) has a thickness that is less than half of said thickness of the coating.

22. The hot stamped coated steel product according to claim 1, wherein the Intermediate layer comprises the following components by weight based on total weight: 39 to 47% Fe, 53 to 61% Al, and 0 to 2% Si.

23. The hot stamped coated steel product according to claim 22, wherein the Intermetallic layer comprises the following components by weight based on total weight: 62 to 67% Fe, 30 to 34% Al, and 2 to 6% Si.

24. The hot stamped coated steel product according to claim 1, wherein the hot stamped coated steel product has a mechanical strength in excess of 1000 MPa.

25. The hot stamped coated steel product according to claim 1, wherein the hot stamped coated steel product has a mechanical strength in excess of 1500 MPa.

* * * * *